United States Patent
Nakajima

(10) Patent No.: US 7,259,892 B2
(45) Date of Patent: Aug. 21, 2007

(54) PRINTER CORRECTING APPARATUS AND METHOD OF CONTROLLING SAME

(75) Inventor: Nobuyuki Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 10/372,074

(22) Filed: Feb. 21, 2003

(65) Prior Publication Data

US 2003/0160986 A1   Aug. 28, 2003

(30) Foreign Application Priority Data

Feb. 22, 2002   (JP) ............. 2002-046682

(51) Int. Cl.
*G06F 15/00* (2006.01)
(52) U.S. Cl. ............. 358/1.9; 358/504
(58) Field of Classification Search ............. 358/1.9, 358/1.2, 529, 518, 504, 515, 517, 1.1; 382/167, 382/270, 162, 294; 355/40; 347/115, 116
See application file for complete search history.

(56) References Cited

U.S. PATENT DOCUMENTS 6,909,814 B1   6/2005   Nakajima ............ 382/274
7,019,867 B2 *   3/2006   Kuwata et al. ............ 358/1.9
7,031,550 B2   4/2006   Nakajima ............ 382/274

FOREIGN PATENT DOCUMENTS

JP   2001-094797   4/2001

* cited by examiner

Primary Examiner—King Y. Poon
Assistant Examiner—Saeid Ebrahimi
(74) Attorney, Agent, or Firm—Fitzpatrick, Cella, Harper & Scinto

(57) ABSTRACT

A calibration for a scanner, which is used as a densitometer, is carried out always with high accuracy. More specifically, an image processing method of generating a conversion condition for a scanner which is used for reading an image and generating image data, is provided. The method including the steps of: obtaining a reading property of an object scanner based on image data obtained by that the object scanner reads a chart, and generating the conversion condition for the object scanner based on the reading property of the object scanner, a previously prepared reading property of a standard scanner and a previously prepared brightness-density conversion condition for the standard scanner.

16 Claims, 16 Drawing Sheets

| ARRAY BLOCK | ACTUAL OUTPUT DATA |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |
| 11 | 44 |
| 12 | 48 |
| 13 | 52 |
| 14 | 56 |
| 15 | 60 |
| 16 | 64 |
| 17 | 68 |
| 18 | 72 |
| 19 | 76 |
| 20 | 80 |
| 21 | 84 |
| 22 | 88 |
| 23 | 92 |
| 24 | 96 |
| 25 | 100 |
| 26 | 104 |
| 27 | 108 |
| 28 | 112 |
| 29 | 116 |
| 30 | 120 |
| 31 | 124 |
| 32 | 128 |
| 33 | 132 |
| 34 | 136 |
| 35 | 140 |
| 36 | 144 |
| 37 | 148 |
| 38 | 152 |
| 39 | 156 |
| 40 | 160 |
| 41 | 164 |
| 42 | 168 |
| 43 | 172 |
| 44 | 176 |
| 45 | 180 |
| 46 | 184 |
| 47 | 188 |
| 48 | 192 |
| 49 | 196 |
| 50 | 200 |
| 51 | 204 |
| 52 | 208 |
| 53 | 212 |
| 54 | 216 |
| 55 | 220 |
| 56 | 224 |
| 57 | 228 |
| 58 | 232 |
| 59 | 236 |
| 60 | 240 |
| 61 | 244 |
| 62 | 248 |
| 63 | 255 |

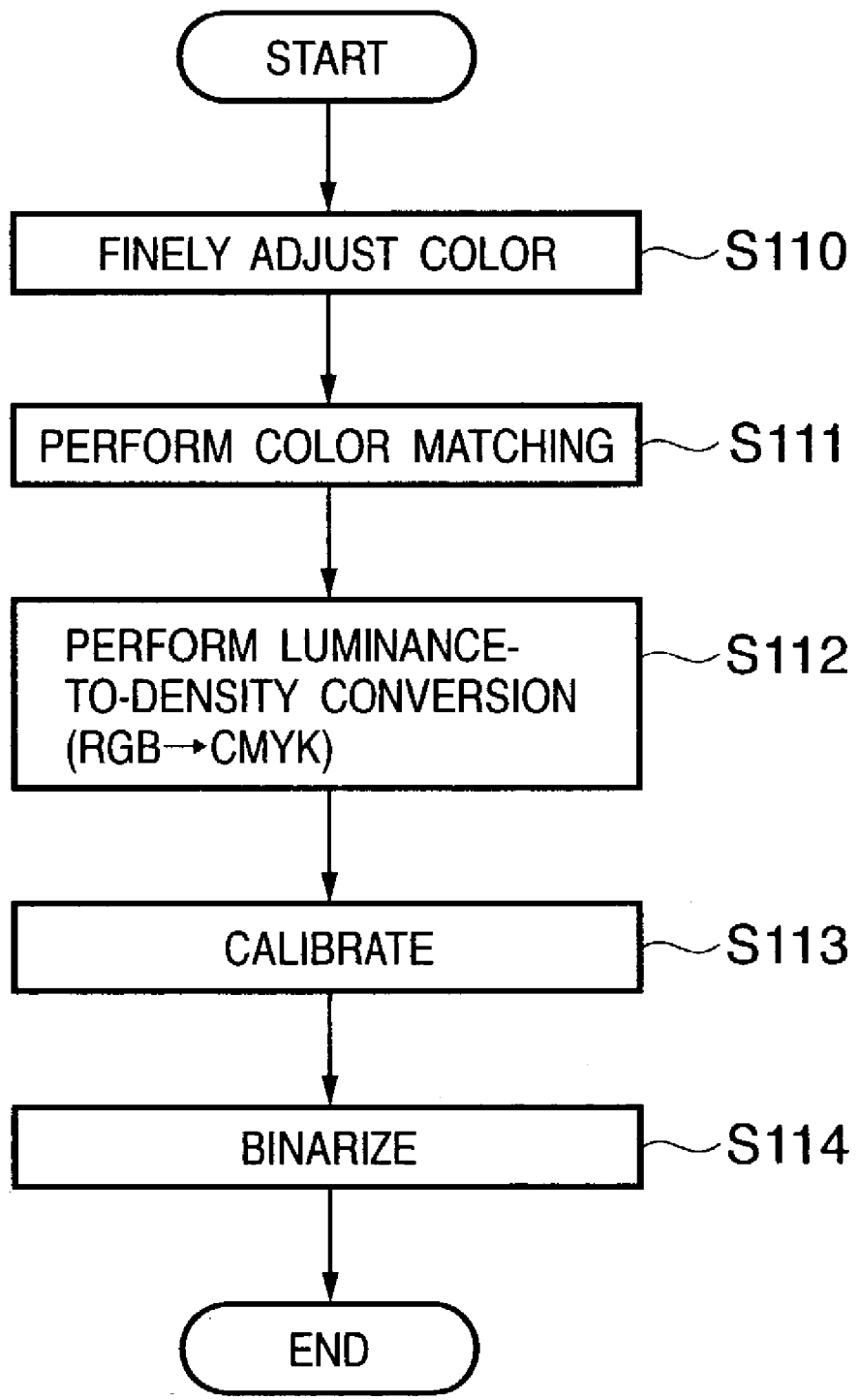

FIG. 13

| PRINTER NAME | TABLE USED |
|---|---|
| PRINTER 001 | REFERENCE SCANNER LUMINANCE-TO-DENSITY CONVERSION TABLE A |
| PRINTER 002 | REFERENCE SCANNER LUMINANCE-TO-DENSITY CONVERSION TABLE A |
| PRINTER 003 | REFERENCE SCANNER LUMINANCE-TO-DENSITY CONVERSION TABLE A |
| PRINTER 004 | REFERENCE SCANNER LUMINANCE-TO-DENSITY CONVERSION TABLE B |

FIG. 15

PRINTER CORRECTING APPARATUS AND METHOD OF CONTROLLING SAME

FIELD OF THE INVENTION

This invention relates to a printer correcting apparatus for stabilizing printing characteristics by suitably calibrating a printer, and to a method of controlling this apparatus.

BACKGROUND OF THE INVENTION

It is generally known that the printing characteristics of a printing apparatus such as a color printer may change owing to environmental conditions such as the temperature and humidity of the environment in which the printing apparatus is being used. The condition of the environment is not the only factor. There are instances where printing characteristics change as a result of using the printer over a certain period of time. For example, in the case of an electrophotographic printer, there are instances where the photosensitivity characteristics of the photosensitive drum change owing to the aforementioned environmental conditions and due to aging with use, as a result of which printing characteristics such as tonality observed in printed images or the like change from what is desired. In the case of an ink-jet printer, it is known that a change in printing characteristics may occur owing to a change in the ink discharge characteristics of the printhead.

In general, a printer is calibrated to deal with the above-described changes in printing characteristics. In this case, a change in the printing characteristics of individual printers is not the only problem. An additional problem is that in an information processing system in which a plurality of printers are connected via a network, there is a difference in printing characteristics from one printer to another. Accordingly, not only is calibration of each individual printer required but it is also necessary to perform a calibration for the purpose of reducing variations in printing characteristics from one printer to another.

In the prior art, calibration of a printer fundamentally is carried out based upon a command input from a user. For example, when the user observes that the tonality of a printed image is not what is desired, the user commands execution of calibration using a control screen displayed on the printer or on a computer, etc., that is connected to the printer.

However, executing calibration of a printer often is troublesome and such calibration is a task that demands considerable user labor. For example, consider calibration of a printer in which image processing such as a luminance-to-density conversion and a gamma conversion is executed to finally acquire binary data and printing is carried out based upon this data. In order that the results of calibration executed with regard to a gamma correction table will be reflected in the printer in this case, an input of some kind is required at the printer based upon data obtained by the calibration. Making such an input is comparatively troublesome as far as the user is concerned.

Further, there are cases where separate operations are required regarding the printer and the computer connected to the printer in relation to a series of processes involved in execution of calibration, such as the printing and reading of patch data and entry of calibration data. Since these operations cannot be performed at one stroke, a great amount of labor is demanded of the user.

Furthermore, in an information processing system in which a plurality of printers are connected via a network, the above-described operations and processes involved in calibration must be performed a number of times equivalent to the number of connected printers. These operations and processes involved in calibration therefore complicate the user's task even more. Moreover, even if a single printer is shared by a plurality of computers, it is difficult for each user to execute calibration handily when necessary.

SUMMARY OF THE INVENTION

The present invention has been proposed to solve the problems of the prior art and its object is to provide a printer correcting apparatus and method of controlling the same for making it possible to more easily perform calibration for the purpose of providing a printer with stabilized printing characteristics.

According to the present invention, the foregoing object is attained by providing a printer correcting apparatus connected to a printer capable of color printing, comprising input means for inputting color printing information classified by density relating to each color component, which is used in color printing, output by the printer; first correcting means for executing calibration of the input means; and second correcting means for executing calibration of the printer utilizing the color printing information that has been input using the corrected input means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 6 is a diagram illustrating an example of output of patch data that is output from a printer;

FIG. 10 is a diagram for correlating array indices described in the blocks of FIG. 6 and actual numerical values;

FIG. 11 is a flowchart useful in describing the flow of processing when image processing using a printer calibration table is executed;

FIG. 13 is a diagram illustrating an example of a correlation table for correlating selected printer names and reference scanner luminance-to-density conversion tables;

FIG. 15 is a diagram illustrating an example of a scanner chart used in this embodiment.

DETAILED DESCRIPTION OF THE PREFERRED EMBODIMENT

A printer correcting system according to preferred embodiment of the present invention will now be described in detail in accordance with the accompanying drawings. In the embodiment described below, a color laser printer is used as an example of a printer serving as a component in a printer correcting system. However, the present invention can be practiced similarly also with regard to other types of printers such as a color ink-jet printer. Further, according to this embodiment, there is no particular limitation regarding mode of network connection and protocol.

Figure 1:
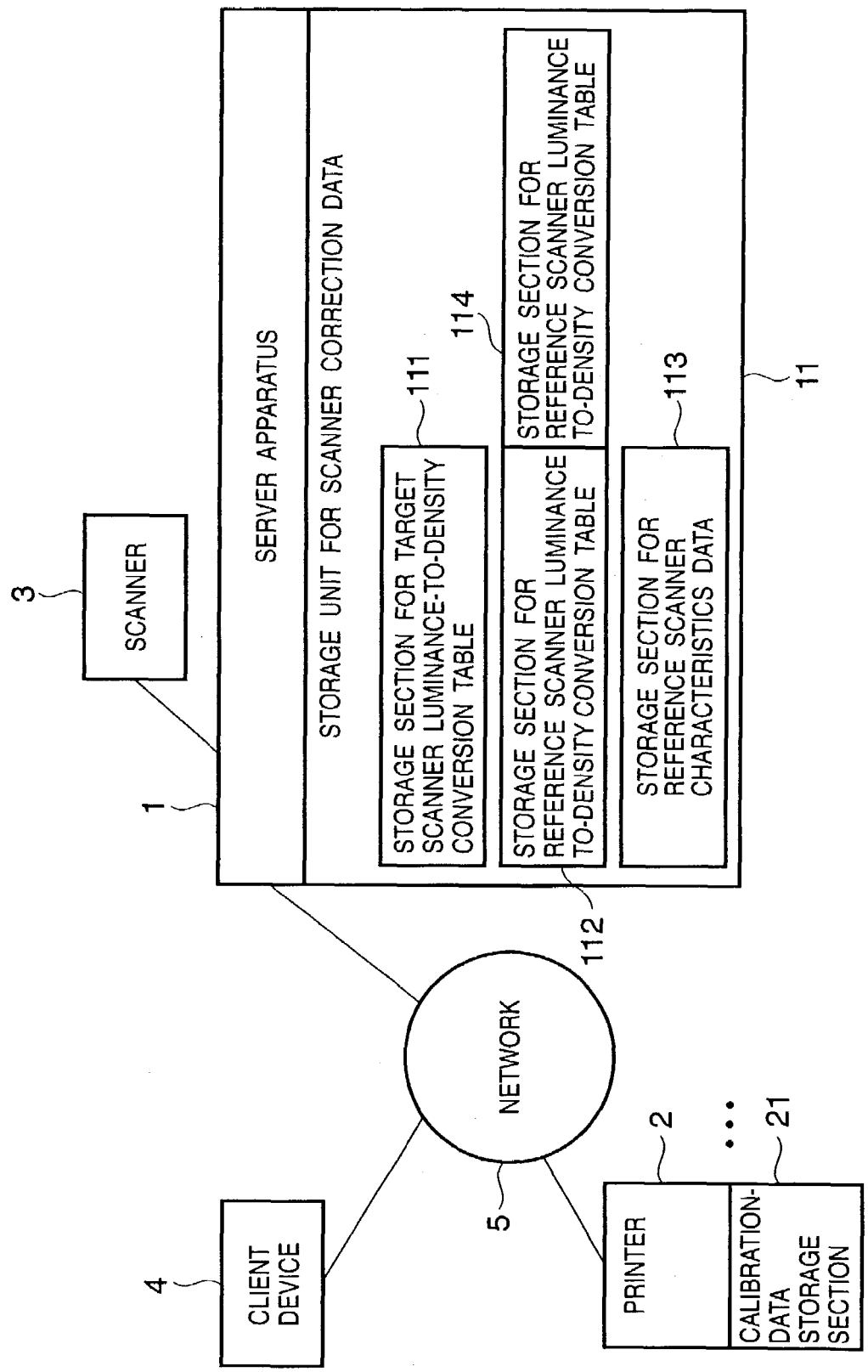
FIG. 1 is a block diagram illustrating the configuration of a printer correcting system according to an embodiment of the present invention.

FIG. 1 is a block diagram illustrating the configuration of a printer correcting system according to this embodiment of the present invention. As shown in FIG. 1, the system includes a server apparatus 1 in which software for implementing the functions of this printer correcting system has been installed. The server apparatus 1 is connected to a network 5.

The server apparatus 1 is equipped with a storage unit 11 for storing scanner correction data, described later. The storage unit 11 has a storage section 111 for storing a target scanner luminance-to-density conversion table, storage sections 112, 114 for storing reference scanner luminance-to-density conversion tables, and a storage section 113 for storing reference scanner characteristics data.

A luminance-to-density conversion table, which is used when an entry is made to any target scanner employed by the user, is stored in the storage section 111. A predetermined luminance-to-density conversion table of a reference scanner of a printer having a certain printer engine characteristic is stored in the storage section 112. A difference in this engine characteristic is caused by a difference ascribable to the type of engine, which differs from printer to printer, as a matter of course, and by a difference in the printing medium used in printing with different colorants. Similarly, a luminance-to-density conversion table of a reference scanner of a printer having a printer engine characteristic different from the printer engine characteristic in the storage section 112 is stored in the storage section 114. Scanner characteristic data obtained beforehand by reading in a scanner chart, described later, using the reference scanner is stored in the storage section 113.

In FIG. 1, a printer 2 is connected to the network 5 and is a printing apparatus to undergo correction in this printer correcting system. The printer 2 is internally provided with a calibration-data storage section 21. Calibration data downloaded from the server apparatus 1 for the purpose of adjusting the printing characteristics of the printer 2 is stored in the storage section 21. It should be noted that a plurality of printers may be connected to the network 5.

A client device 4 is connected to the network 5 and is capable of creating and editing print data desired by the user and of instructing the printer 2 to perform printing. Client devices connectable to the network 5 are not limited to a single device. A plurality of client devices can be connected to the network 5 and it is possible for each of these client devices to instruct the printer 2 to print. In general, processing relating to printer correction is performed by the system administrator using the server apparatus 1, and printing of ordinary print data often is executed in response to an operation performed at the client device 4.

Further, a scanner 3 is connected to the server apparatus 1. When patch data output by the printer 2 for use in a correction is measured, in this embodiment the scanner 3 is corrected as a target scanner by the server apparatus 1 so as to obtain a stable input. Scanner correction data used at this time is stored in the storage section 111 for the target scanner luminance-to-density conversion table in the scanner correction-data storage unit 11 of server apparatus 1. Though the scanner 3 in this embodiment is used to measure patch data that is output from the printer 2, it is also possible to employ the scanner 3 for its original use, namely the entry of documents.

Figure 4:
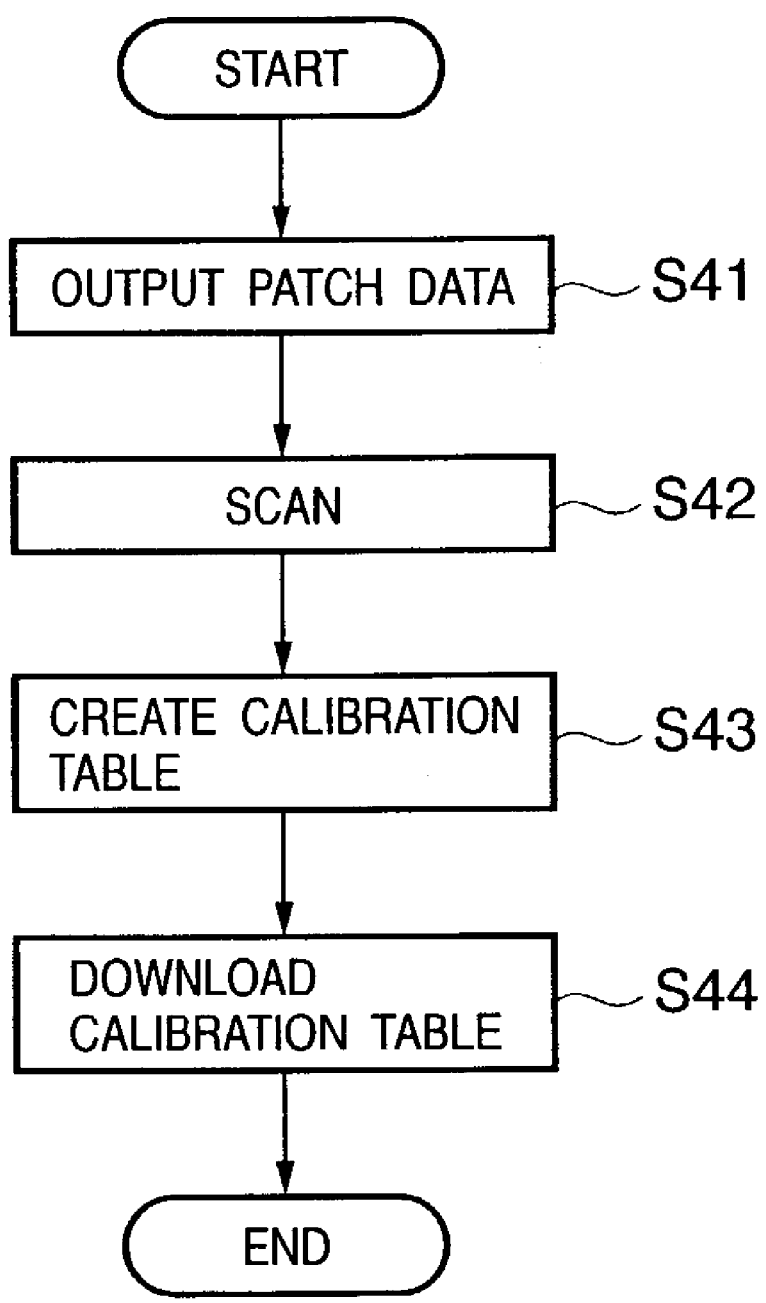
FIG. 4 is a flowchart useful in describing printer correcting processing in a printer correcting system according to an embodiment of the present invention.

Described next will be processing executed when a printer correction (calibration) is performed in the printer correcting system having the configuration set forth above. FIG. 4 is a flowchart useful in describing printer correcting processing in the printer correcting system according to this embodiment of the present invention.

First, via the network 5, the server apparatus 1 instructs the printer 2 to output patch data, and the printer 2 responds by outputting the patch data (step S41). It should be noted that a plurality of printers are connected on the network 5 and a command specifying a printer of interest may be provided by the server apparatus 1 to make selection of a printer possible.

Figure 14:
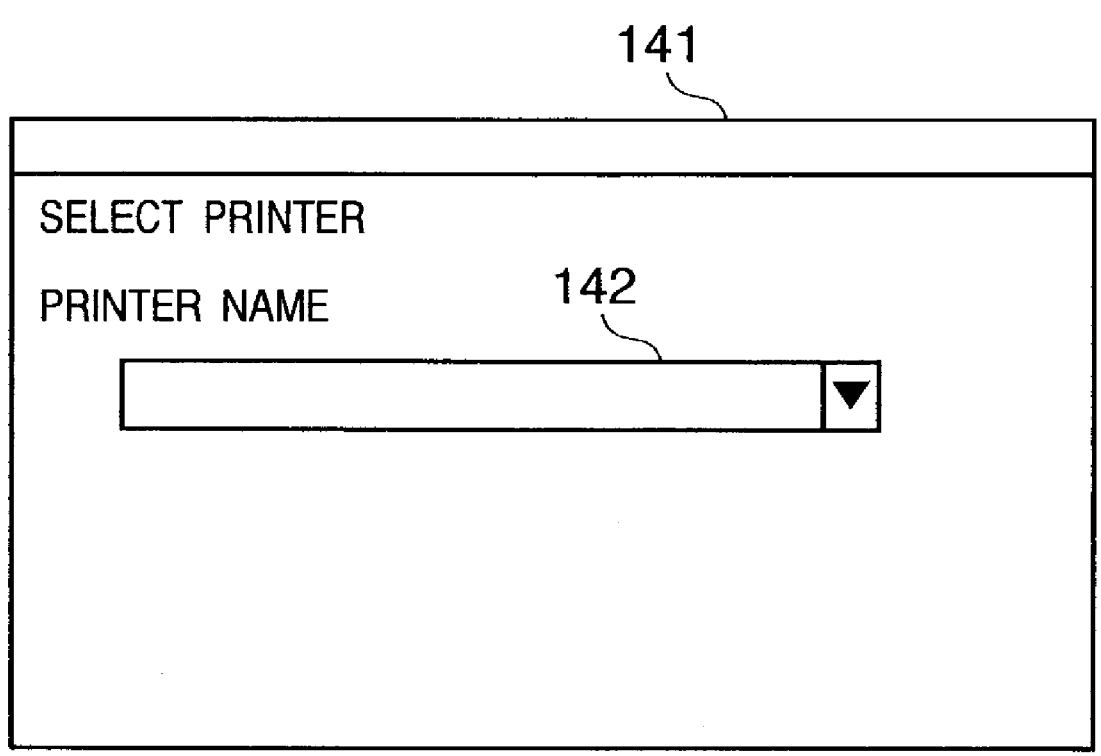
FIG. 14 is a diagram illustrating an example of a user interface screen for selecting a specific printer from the server apparatus.

Specifically, a user interface screen exemplified in FIG. 14 is employed as a method of specifying a printer of interest.

Using a pull-down menu 142 in a dialog box 141, the user selects the name of the printer that is to undergo calibration. At this time a reference scanner luminance-to-density conversion table that corresponds to the selected printer name is selected at the server apparatus 1. FIG. 13 is a diagram illustrating an example of a correlation table for correlating selected printer names and reference scanner luminance-to-density conversion tables. It is assumed that the correlation table depicted in FIG. 13 is created in advance and stored in the server apparatus 1. It is assumed that the specific method of specifying a printer, such as the protocol and commands, etc., is in accordance with the general rules of network management.

Figure 6:
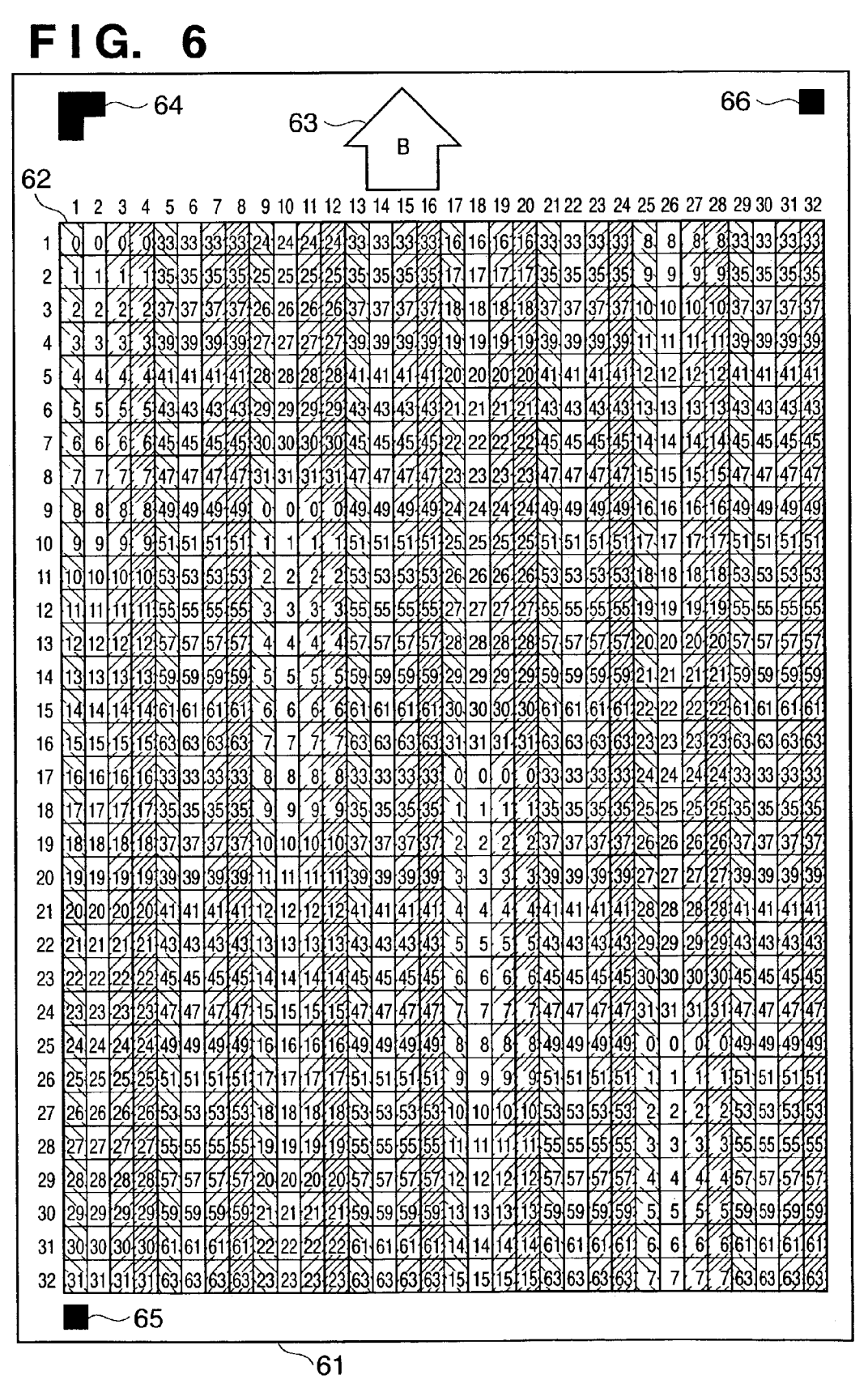

FIG. 6 is a diagram illustrating an example of output (printout) of patch data that is output from the printer 2. In this embodiment, as shown in FIG. 6, the patch data is obtained by forming various data in an A4-size printer chart 61 and then printing out the chart from the printer 2. A data section 62 is formed on the chart for the purpose of ascertaining the density characteristics of the printer. In the example shown in FIG. 6, one page is divided into 32 blocks vertically and 32 blocks horizontally, for a total of 1024 blocks.

As illustrated in FIG. 6, the blocks are arrayed by color, namely cyan, magenta, yellow and black, which are the basic colors of printing toner, in the horizontal direction of the data section 62 in printer chart 61. The numerical values written in these blocks indicate the indices of the array. The relationship between the indices of the array and actual numerical values is as shown in FIG. 10. FIG. 10 is a diagram for correlating array indices described in the blocks of FIG. 6 and actual numerical values. By way of example, actual output data in array block 0 is 0, actual output data in array block 32 is 128, and actual output data in array block 63 is 255. Thus, numerical values of 0 to 255 are used as density values in a system in which each of the colors C, M, Y, K is represented by eight bits. In another system using a different number of bits, however, implementation is possible by suitably changing the numerical values in the correspondence table of FIG. 10.

Specifically, in FIG. 6, on the highlighted side of array blocks 0 to 31, 32 tones are arranged as blocks at four locations, and on the shadow side of array blocks 33 to 63, 16 tones are arranged as blocks at eight locations. The reason for providing this difference in numbers of tones between the highlighted and shadow areas is that in the printer correcting system according to this embodiment, the highlighted side requires more exacting tone information than does the shadow side. A further reason for providing the difference in the numbers of highlighted and shadow blocks is that a variation in the input value to the scanner to which the patch data is applied tends to be greater on the shadow side than on the highlighted side.

An arrow symbol 63 in FIG. 6 serves as discrimination information. By being given the form of an arrow, the discrimination information notifies the user of the orientation of the printer chart 61 when it is placed on the platen of the scanner 3. Provided within the arrow 63 is the character "B". This functions to call the user's attention to the fact that the printer chart 61 having the arrow 63 serving as discrimination information is for printer use. Reference numerals 64, 65 and 66 in FIG. 6 indicate registration marks for detecting the fact that the chart has been placed on the scanner platen correctly.

The printer chart 61 is output (printed) by the printer 2 in response to a command from the server apparatus 1 via the network 5, as mentioned above. Alternatively, the printer 2 may internally possess information for forming patch data of the abovedescribed format, and patch data based upon this information may be output as the printer chart in response to a command from the server apparatus 1. Further, information for forming the patch data may be transmitted to the printer 2 from the side of the server apparatus 1, whereby the patch data is output as the printer chart. Here the information for forming the patch data would be dependent upon the command system specific to the printer 2.

After the patch data is output as described above, the printer chart 61 is read by the scanner 3 and the output patch data is measured (step S42). RGB signal values of each block are obtained by measurement of the patch data using the scanner 3, and these signal values are sent back to the server apparatus 1. Based upon the disposition of the blocks in the patch data, the server apparatus 1 calculates the average values of the four locations on the highlighted side and the average values of the eight locations on the shadow side from the RGB signal values that have been obtained, whereby there can be obtained RGB signal values of 48 tones of the colors C, M, Y, K. Using the luminance-to-density conversion table indicating the corresponding relationship between the RGB luminance values specific to the scanner 3 and the CMYK density values of the printer 2, the server apparatus 1 generates density characteristic values of 48 tones from the RGB luminance signal values of the 48 tones obtained by measurement.

Figure 2:
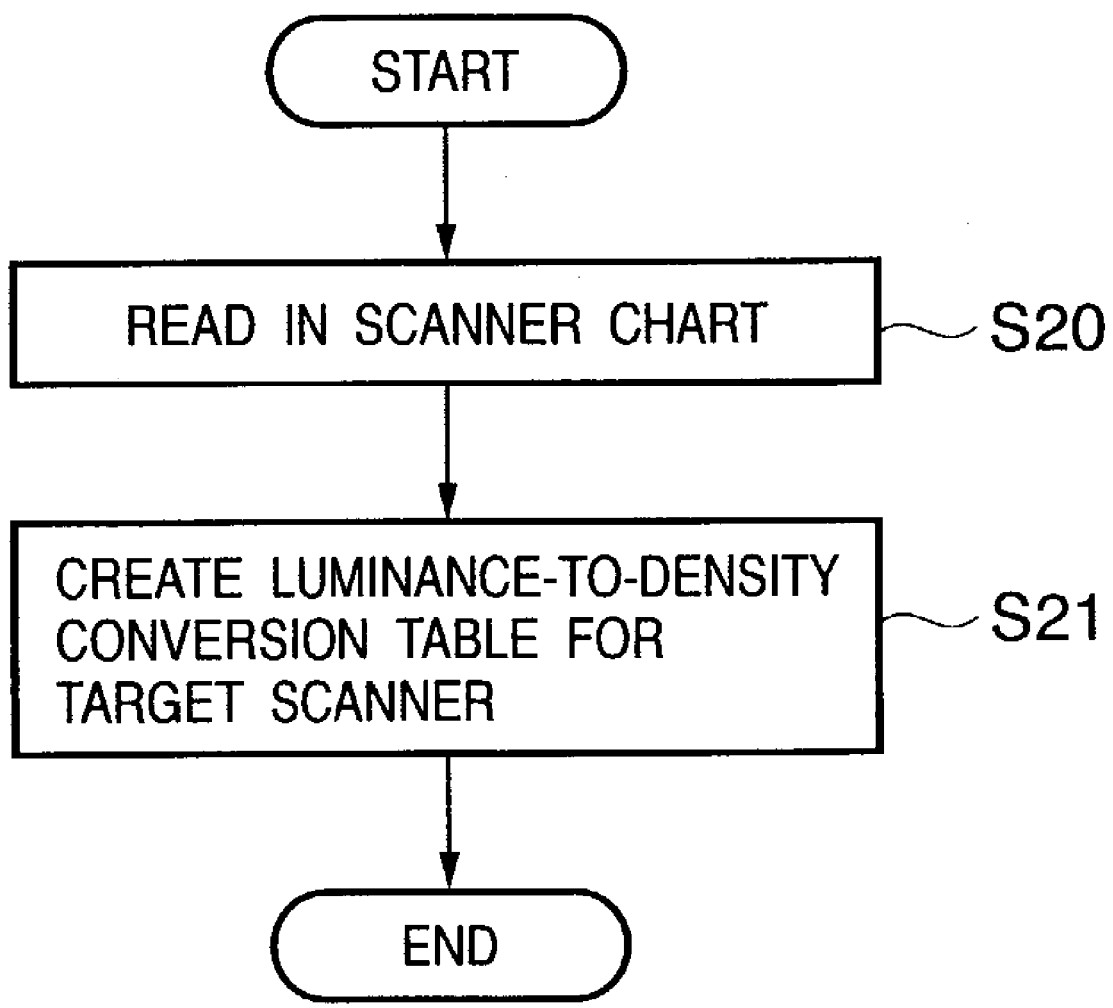
FIG. 2 is a flowchart useful in describing a scanner correcting procedure according to this embodiment.
Figure 3:
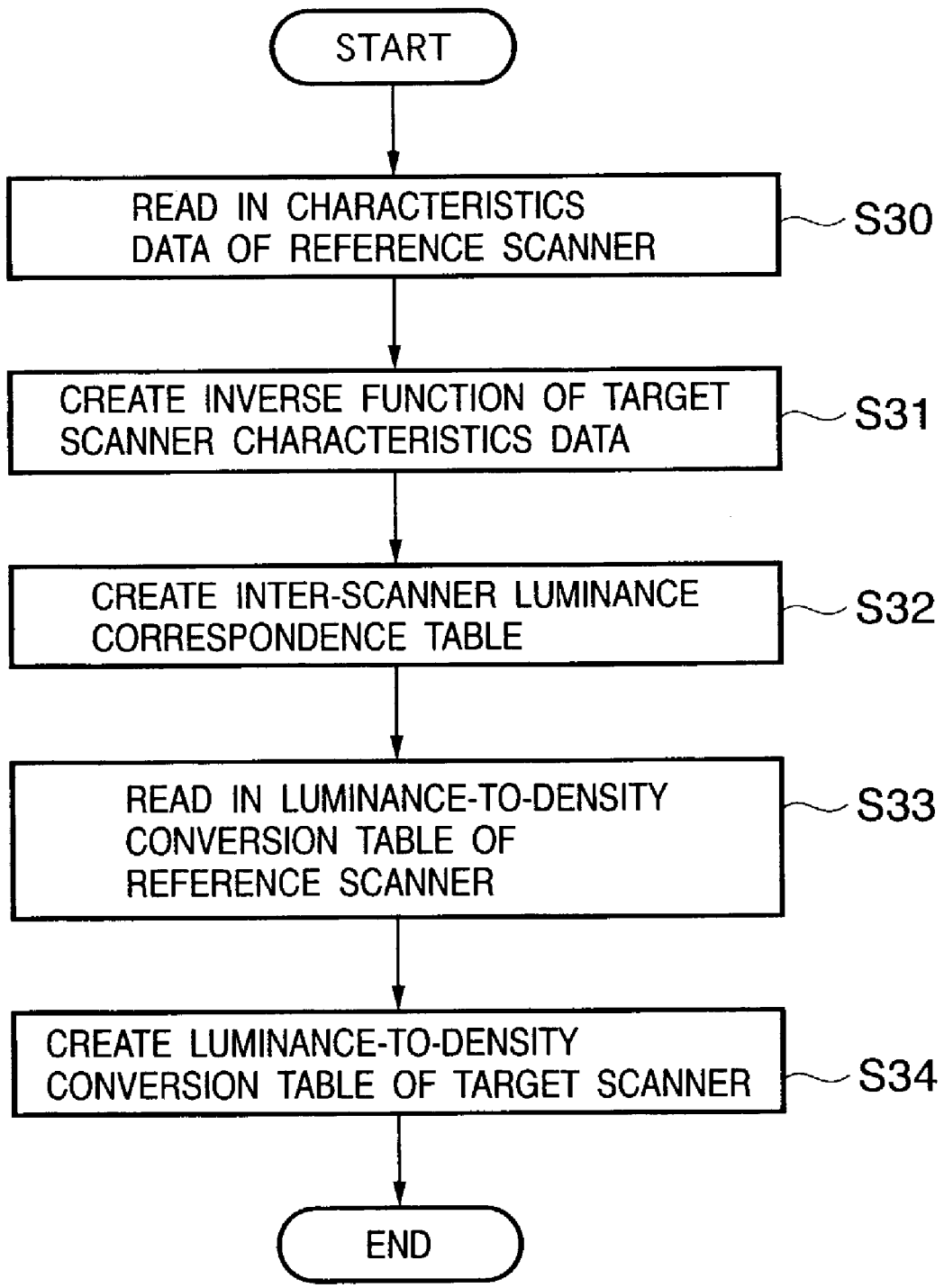
FIG. 3 is a flowchart useful in describing a procedure for creating a target scanner luminance-to density conversion table.

Reference will be had to FIGS. 2, 3 and 12 to describe the creation of the luminance-to-density conversion table specific to scanner 3. As will be described below, the scanner correction is for the purpose of creating data that will eventually be stored in the storage section 111 for storing a target scanner luminance-to-density conversion table. The data is created using the luminance-to-density conversion table of the target printer selected from the previously prepared storage section 112 for storing a reference scanner luminance-to-density conversion table or storage section 114 for storing a reference scanner luminance-to-density conversion table, and other information newly obtained with respect to the scanner characteristics data within the storage section 113 for storing reference scanner characteristics data.

FIG. 2 is a flowchart useful in describing a scanner correcting procedure according to this embodiment. As shown in FIG. 2, first the scanner 3 reads in the scanner chart (step S20). Reference paper on which printing has already been performed as by offset printing is used as the scanner chart. It should be noted that the scanner chart differs from the printer chart output from the printer 2 at step S41 above.

Figure 15:
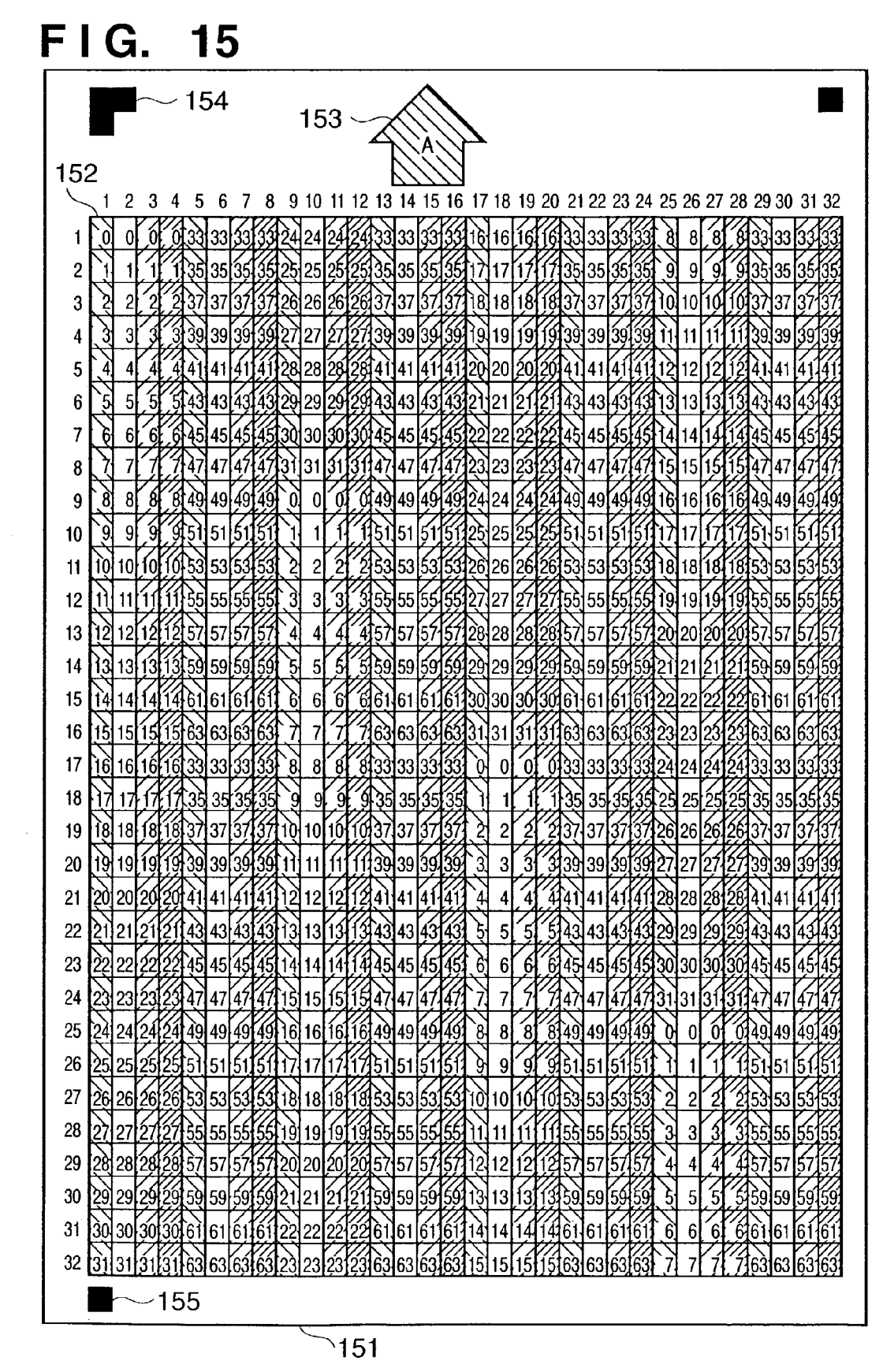

FIG. 15 is a diagram showing an example of the scanner chart used in this embodiment. As shown in FIG. 15, A4-size reference paper is used as a scanner chart 151. A data section 152 is formed on the scanner chart 151. In a manner similar to that of the blocks formed on the printer chart 61 of FIG. 6, one page is divided into 32 blocks vertically and 32 blocks horizontally, for a total of 1024 blocks used as the data section 152.

Further, an arrow symbol 153 functions as discrimination information for discrimination purposes. By being given the form of an arrow, the discrimination information notifies the user of the orientation of the scanner chart 151 when it is placed on the platen of the scanner 3. This is similar to the case of the printer chart shown in FIG. 6. Formed within the arrow 153 is the character "A". This functions to call the user's attention to the fact that the chart having the arrow 153 is the scanner chart.

Further, the arrow symbol 63 serving as the discrimination information on the printer chart 61 shown in FIG. 6 is filled in with a certain color (e.g., cyan). The arrow symbol 153 serving as the discrimination information on the scanner chart 151 shown in FIG. 15 also is filled in with a color but this color (e.g., magenta) is different from that of arrow 63. This is to make it easy for the user to clearly distinguish the difference between the two charts at a glance. Reference numerals 154 and 155 in FIG. 15 indicate registration marks the function of which is the same as that of the registration marks 64 to 66 in FIG. 6.

Figure 12A:
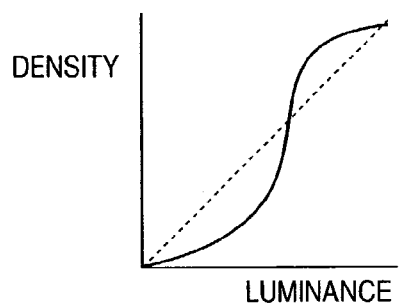
FIGS. 12A to 12H are diagrams illustrating examples of tables used when a scanner correction is carried out.
Figure 12B:
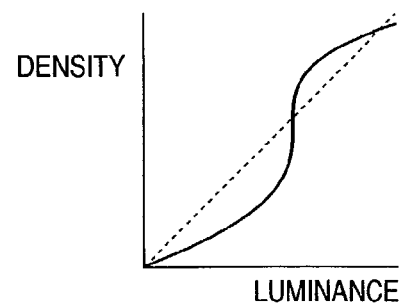
Figure 12C:
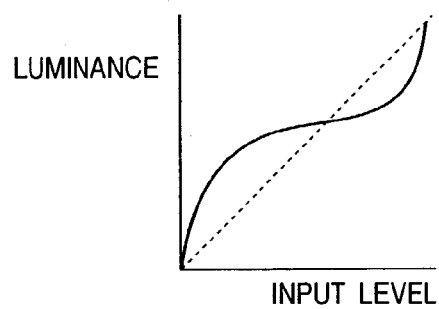

FIGS. 12A to 12H are diagrams illustrating examples of tables used when the scanner correction is carried out. FIG. 12C shows an example of characteristics data for when the scanner chart has been read in by the target scanner. Input level is plotted along the horizontal axis and luminance along the vertical axis of FIG. 12C. In this embodiment, the number of levels actually input is 48, as mentioned above, but these are converted to 256 levels by approximation equations. It should be noted that only one type of data is written in FIGS. 12A to 12H in order to simplify the description. In actuality, however, similar data exists for each of the four data types C, M, Y, K. The characteristics data that has been read in by the target scanner is stored in a memory, which is not shown.

Figure 12D:
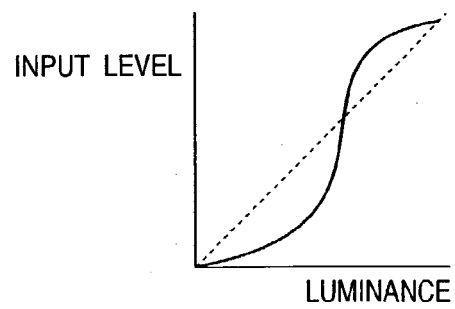
Figure 12E:
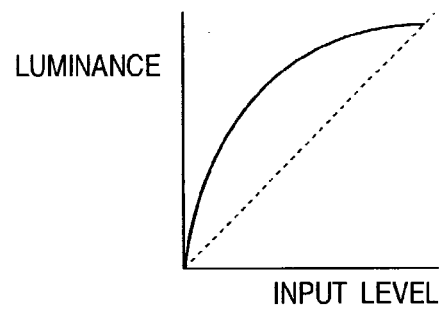

Next, the luminance-to-density conversion (characteristic) table of the target scanner is created by the scanner 3 (step S21). The particulars of this processing will be described in detail with reference to FIG. 3 and FIGS. 12A to 12H. FIG. 3 is a flowchart useful in describing a procedure for creating the target scanner luminance-to-density conversion table. As shown in FIG. 3, first the scanner 3 reads in the characteristics data of the reference scanner (step S30). The characteristics data of the reference scanner has been stored in the storage section 113 in advance, as described above. FIG. 12E is a diagram illustrating an example of the characteristics data of the reference scanner. This characteristics data of the reference scanner can be acquired by reading in the scanner chart 151 beforehand using the reference scanner. The characteristics data of the reference scanner may be prepared on the side of the maker that provides the printer correcting system of this embodiment.

Next, the inverse function of the characteristics data of the target scanner is created (step S31). FIG. 12D is a diagram illustrating the inverse function of the characteristics data of the target scanner. The inverse function can be obtained by inverting the y=x line and the line symmetry, i.e., the vertical axis and the horizontal axis, in the characteristics data of the target scanner, which is shown in FIG. 12C, obtained at step S20.

Figure 12F:
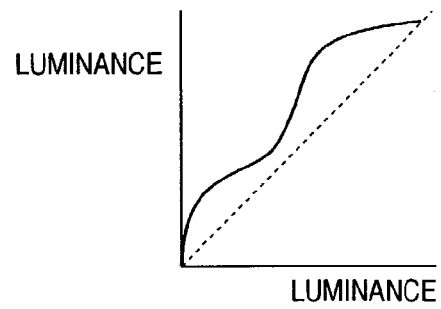

Next, an inter-scanner luminance correspondence (characteristic) table is created (step S32). FIG. 12F is a diagram illustrating the inter-scanner luminance correspondence table. This can be obtained by combining the tables of FIGS. 12D and 12E. That is, the inter-scanner luminance correspondence (characteristic) table is a table (characteristic) for correlating the input luminance of the target scanner and the input luminance of the reference scanner. The table can be obtained as by using an approximation equation.

Next, the luminance-to-density conversion table of the reference scanner is read in (step S33). As mentioned above, reference scanner luminance-to-density conversion (characteristic) tables have already been stored in the scanner correction data storage unit 11 in a number equivalent to the number of types of printer engine characteristics. In this embodiment, as shown in FIG. 1, the storage section 112, which stores a certain luminance-to-density conversion table of the reference scanner of a printer having a certain printer engine, and the storage section 114, which stores the luminance-to-density conversion table (characteristic) of the reference scanner of a printer having a printer engine characteristic different from the above-mentioned printer engine characteristic, are exemplified.

With regard to the reading in of the luminance-to-density conversion table of the reference scanner at step S33, first the user selects the name of the printer to undergo calibration from the pull-down menu 142 of the dialog box 141 using the user interface screen shown in FIG. 14. As a result, the luminance-to-density conversion table of the target printer is specified in the server apparatus 1 using the table of FIG. 13 that correlates the printer names and tables used. The specified table is read in.

FIG. 12A is a diagram illustrating an example of a reference scanner luminance-to-density conversion table having a certain printer engine characteristic. The luminance-to-density conversion table of the reference scanner can be obtained beforehand by using the reference scanner and a densitometer to scan a chart, which is for creating a luminance-to-density conversion table, output by the printer having the applicable printer engine characteristic, and correlating the input luminance of the reference scanner and the result of normalizing the read values of the densitometer to 0 to 255.

Figure 16:
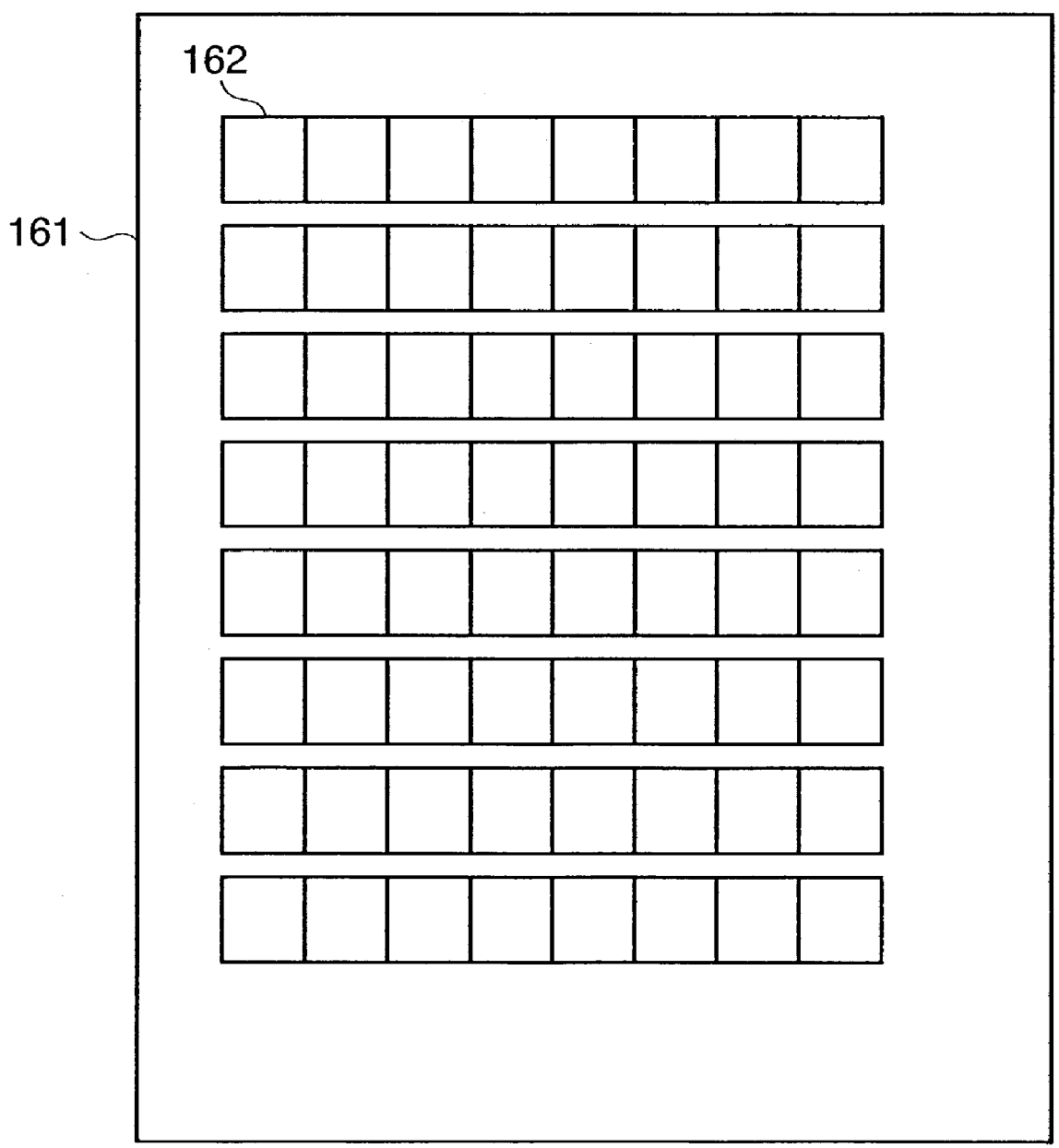
FIG. 16 is a diagram illustrating an example of a chart for creating a luminance-to-density conversion table.

FIG. 16 is a diagram illustrating an example of a chart for creating a luminance-to-density conversion table. As shown in FIG. 16, patch data 162 has been formed on a sheet of output paper 161. In this embodiment, the patch data 162 is provided with density gradations and the applicable charts are output classified according to C, M, Y and K toners. The densities in the example of FIG. 16 have 64 tones, though the number of tones may be 256 or some other number.

Figure 12G:
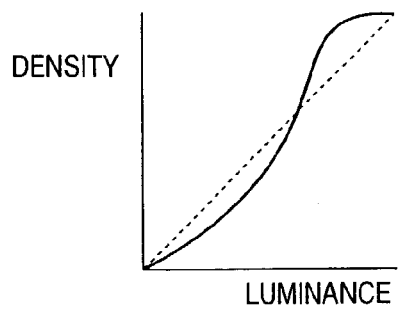

Next, a luminance-to-density conversion table of the target scanner is created (step S34). FIG. 12G is a diagram illustrating an example of a luminance-to-density conversion table for the target scanner. This diagram can be obtained by combining the reference scanner luminance-to-density conversion table, which is illustrated in FIG. 12A, obtained at step S33, and inter-scanner luminance correspondence table shown in FIG. 12F. The luminance-to-density conversion tables of the target scanner are created dynamically in accordance with the procedure comprising the above-described steps and are stored in the storage section 111 for the luminance-to-density conversion table of the target scanner. Each of the stored tables is used in processing steps described below.

Figure 12H:
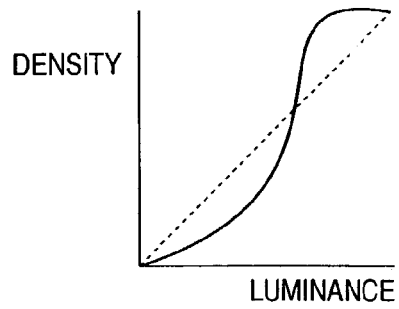

In case of a printer engine characteristic different from that of FIG. 12A, processing is executed through a similar procedure by adopting, e.g., FIG. 12B as the luminance-to-density conversion table of the reference scanner and FIG. 12H as the luminance-to-density conversion table of the target scanner. Scanner correction will be described with reference to FIG. 2, FIG. 3 and FIGS. 12A to 12H. In a case where the input characteristic of a scanner changes or the type of scanner differs, as mentioned above, it is possible to obtain a universal luminance-density conversion relationship by performing the scanner correction again. It should be noted that scanning usually is executed through a scanner driver implemented in the server apparatus 1. The setting of scanner resolution and the designation of an input area are carried out by this scanner driver.

Figure 5A:
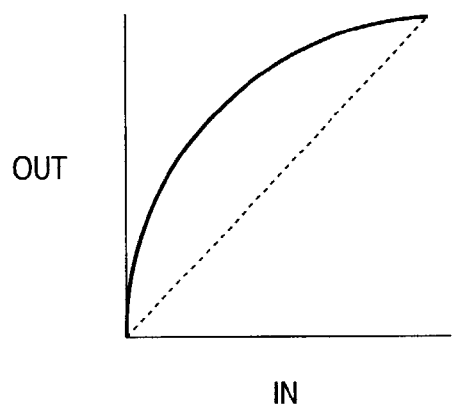
FIGS. 5A to 5C are diagrams useful in describing the gist of calibration performed by a server apparatus.
Figure 5B:
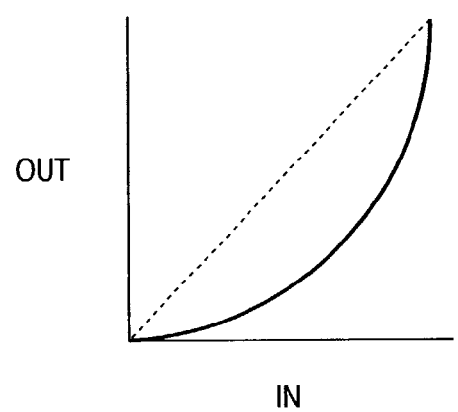
Figure 5C:
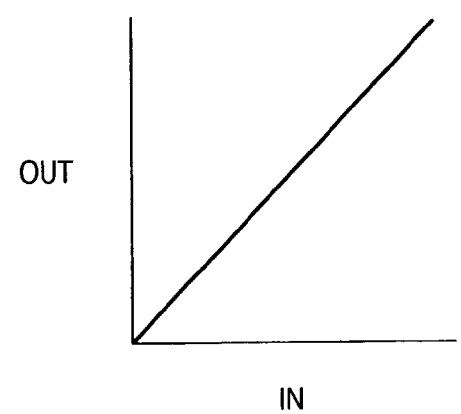

As mentioned above, the creation of a calibration table of a printer selected by the server apparatus 1 is performed after scanning is carried out (step S43). FIGS. 5A to 5C are diagrams useful in describing the gist of calibration performed by the server apparatus 1. FIG. 5A shows an input-output relationship indicated by a curve obtained by interpolating density characteristic values of 48 tones for each of the colors. A curve for only one color is illustrated in order to simplify the description, though in actuality similar processing is executed with regard to the four colors C, M, Y, K.

Ideal values of the density characteristic in this embodiment with regard to the curve of FIG. 5A are assumed to be indicated by the linear curve shown in FIG. 5C. Accordingly, in order to make the presently prevailing density characteristic shown in FIG. 5A approach the ideal density characteristic shown in FIG. 5C, a calibration table shown in FIG. 5B is obtained by the inverse function.

Next, the calibration table created at step S43 is downloaded to the printer 2 via the network 5 by the server apparatus 1. If a plurality of printers have been connected to the network 5, then it will suffice to specify the printer of interest in a manner similar to that when the patch data is output. The calibration table thus downloaded is stored in the calibration-data storage section 21 of the printer 2. The download command is dependent upon the command system of the printer 2.

Figure 7:
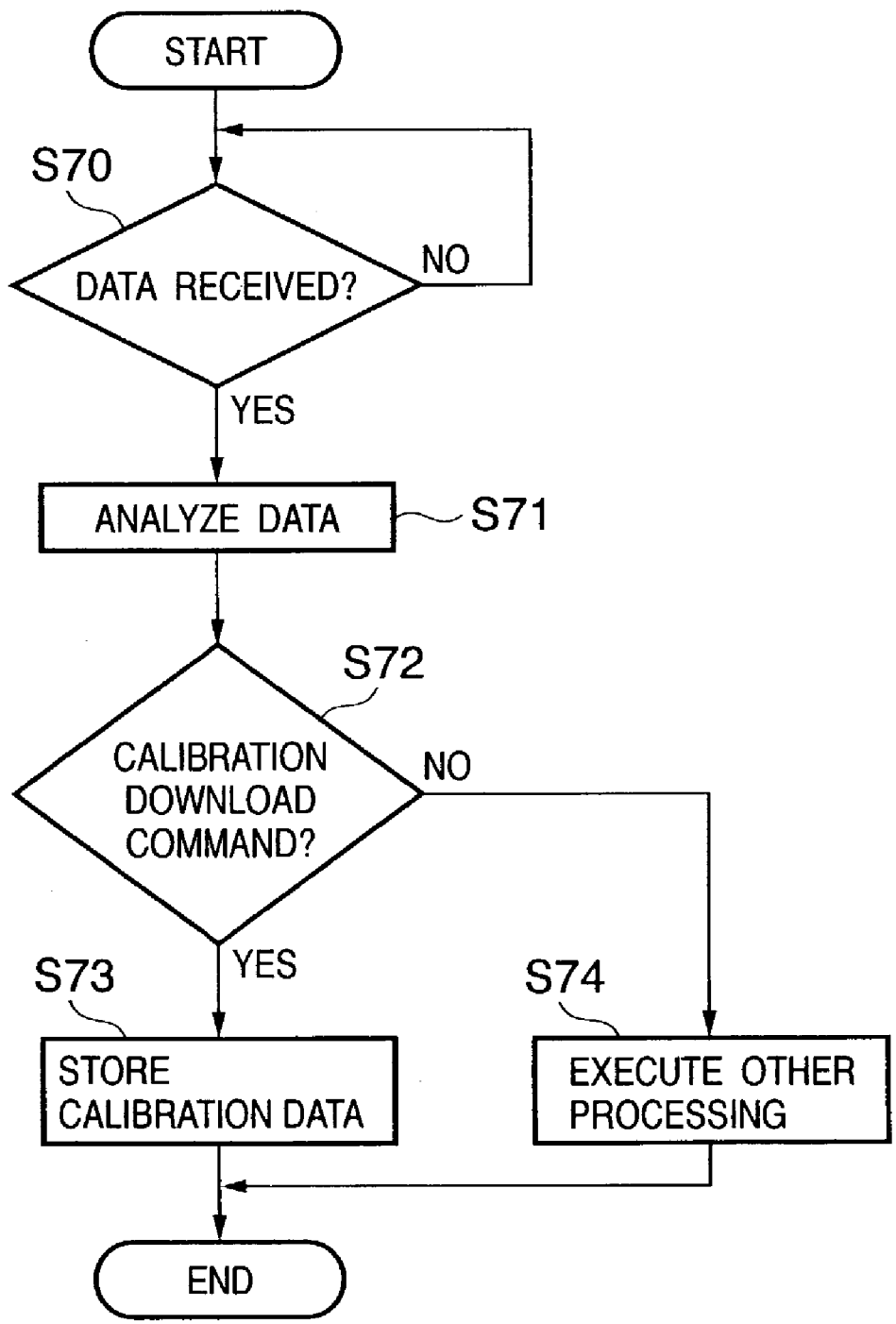
FIG. 7 is a flowchart useful in describing the flow of processing when download data is received in a printer.

FIG. 7 is a flowchart useful in describing the flow of processing when download data is received by the printer 2. As shown in FIG. 7, first the printer 2 determines whether any data has been received (step S70). If it determined that no data has been received ("NO" at step S70), the processing of step S70 is repeated. If it determined that data has been received ("YES" at step S70), then the printer 2 analyzes the data received (step S71).

The printer determines based upon the data analysis whether the received data is a calibration download command (step S72). If it is determined that the received data is a calibration download command ("YES" at step S72), then the received calibration table is stored in the calibration-data storage section 21 (step S73). On the other hand, if it is determined that the received data is not a calibration download command ("NO" at step S72), then the printer 2 analyzes print data, constructs a page layout, executes image processing and performs printing, etc., using the calibration table (step S74). It should be noted that ordinary print data is delivered from the application of the server apparatus 1 to the printer 2 via the printer driver of the server apparatus 1.

FIG. 11 is a flowchart useful in describing the flow of processing when image processing using the calibration table of printer 2 is executed. First, color is fined tuned with regard to an entered RGB signal (step S110). Fine tuning of color involves a luminance correction and a contrast correction. Color matching processing is executed (step S111). This color matching processing is processing for matching the color tint of the monitor and that of the printer.

Next, processing for making the luminance-to-density conversion is executed (step S112). This processing is for effecting a conversion from the luminance RGB data, which is the input signal, to density CMYK data, which is the print signal of the printer. Calibration processing is executed next (step S113). This is processing for adopting a multivalued signal of eight bits per C, M, Y, K as an input/output signal and linearizing the output characteristic using the calibration table, as described above with reference to FIG. 5. Next, the 8-bit signal for each of C, M, Y, K is converted to a signal in accordance with the output system. In general, the 8-bit signals are binarized to 1-bit signals for respective ones of C, M, Y, K (step S114).

Figure 8:
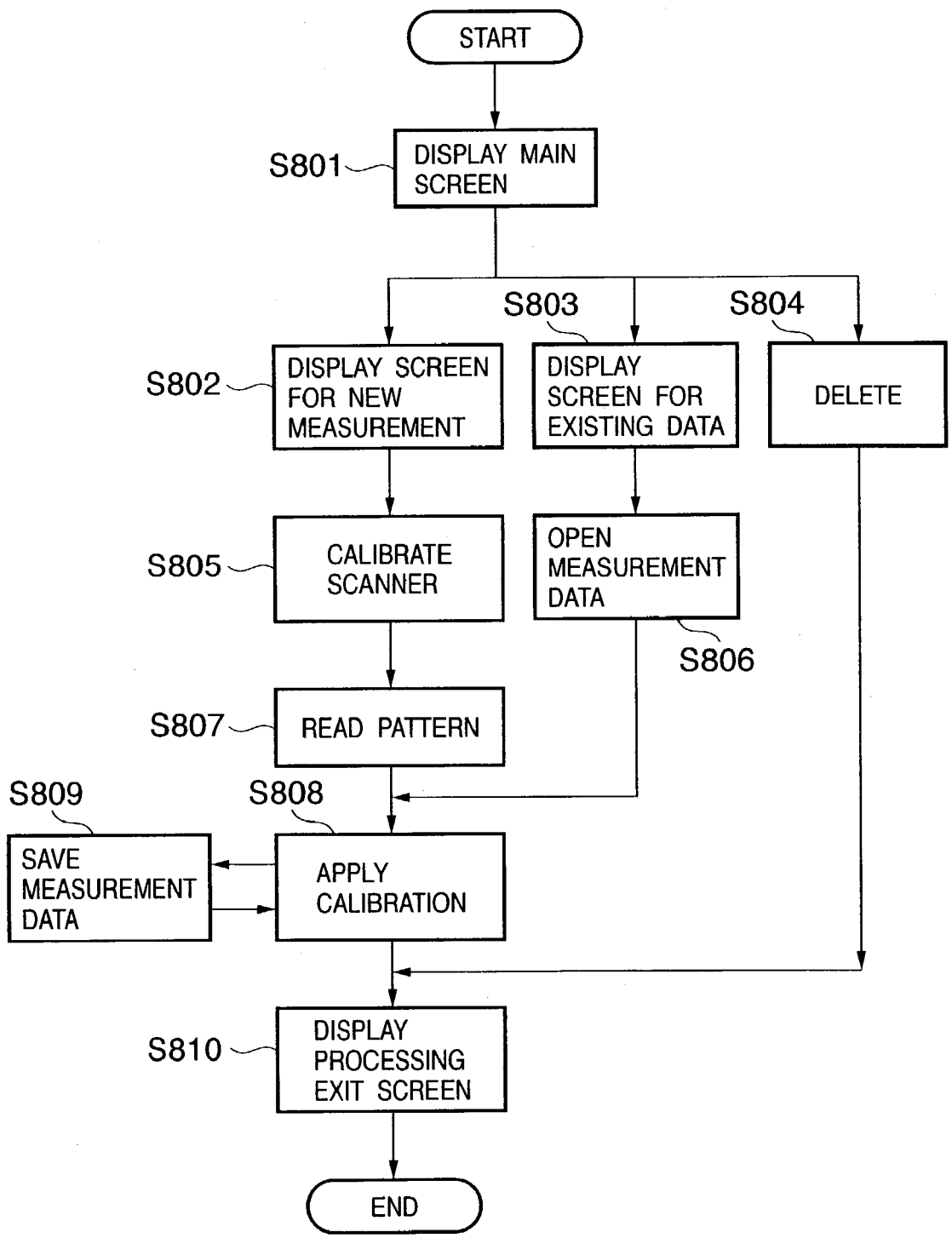
FIG. 8 is a flowchart useful in describing processing that employs a user interface screen in an application for executing processing in the printer correcting system of this embodiment.
Figure 9:
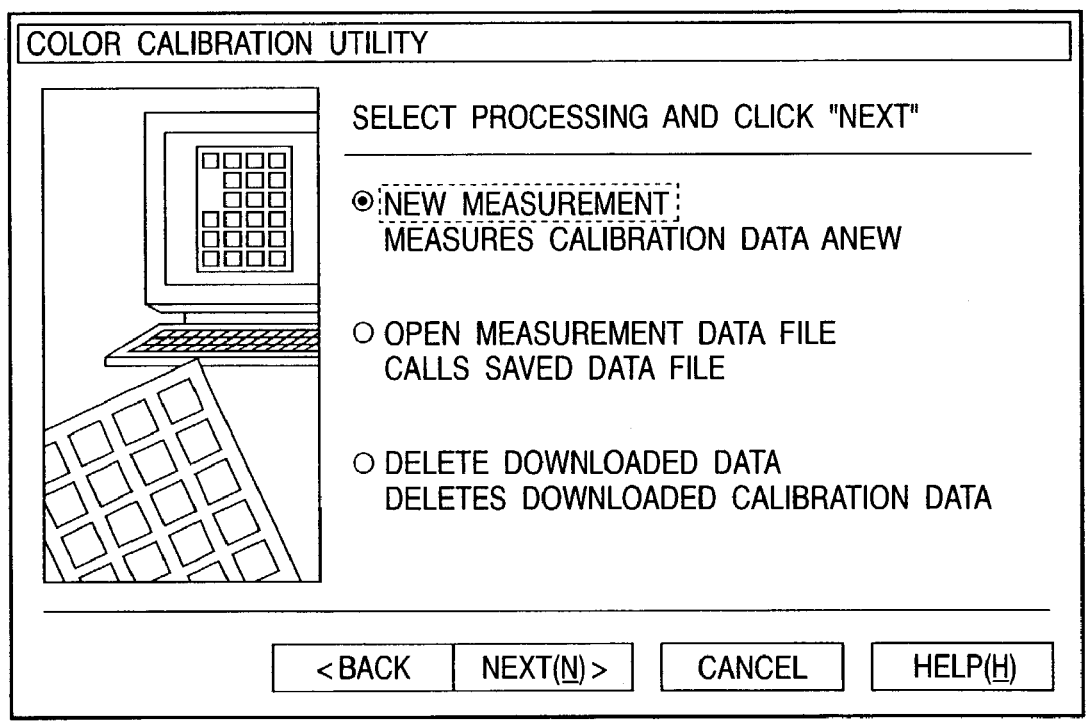
FIG. 9 is a diagram illustrating an example of a main screen of an application in this embodiment.

The user interface screen of the server apparatus 1 in the printer correcting system according to this embodiment of the invention will be described next. The user interface screen described below is displayed on the display screen of the server apparatus 1 as one type of application in the printer correcting system according to this embodiment. FIG. 8 is a flowchart useful in describing processing that employs the user interface screen in an application for executing processing in the printer correcting system of this embodiment. FIG. 9 is a diagram illustrating an example of a main screen of an application in this embodiment.

First, a main screen of the kind shown in FIG. 9 is displayed (step S801). By clicking buttons labeled "NEXT", "BACK", "CANCEL" and "HELP" on the screen shown in FIG. 9, the display shifts to the next related screen. This is basically the same arrangement adopted for other screens as well. Three selectable menu items are provided on the main screen of FIG. 9, namely "NEW MEASUREMENT", "OPEN MEASUREMENT DATA FILE" and "DELETE DOWNLOADED DATA". If "NEW MEASUREMENT" is selected and then "NEXT" is clicked, the processing of step S802 is executed.

At step S802, the screen for new measurement is displayed and patch data is output from the printer 2. At this time the user selects the printer of interest by selecting the name of the printer to undergo calibration from the pull-down menu 142 in the dialog box 141, as described above, using the user interface screen depicted in FIG. 14. In response, the server apparatus 1 specifies the reference scanner luminance-to-density conversion table of the target printer using the table shown in FIG. 13 that correlates printer names and tables used.

After the reference scanner luminance-to-density conversion table of the target printer is specified, correction of the scanner 3 by the server apparatus 1 is performed in the manner described above and a luminance-to-density conversion table specific to the scanner 3 (the target scanner luminance-to-density conversion table) is created (step S805). After the correction of the scanner 3 is carried out, patch data that has been printed out by the target printer, which data was read by the scanner 3 using the luminance-to-density conversion table created by the scanner in the manner described above (the luminance-to-density conversion table of the target scanner), is processed, whereby measurement of the patch data is performed (step S807).

Next, the calibration is applied (step S808). In application, the calibration table is created at step S43 and the calibration table is downloaded to the printer 2 at step S44 as described above with reference to FIG. 4. In the processing of step S808, a button for shifting to the processing of step S809 is provided, whereby it is possible to shift to this processing by having the user click the button provided.

The scanning data measured at step S807 is saved at step S809. The saved data can be used in processing that employs already measured data, described below. When the processing of step S809 ends, control returns to step S808. Next, a processing exit screen is displayed at step S810. Processing is exited when quitting of the application is designated using the processing exit screen. If a designation to return to the main screen is made at this time, control returns to step S801 and the above-described processing is repeated.

If "OPEN MEASUREMENT DATA FILE" is selected on the main screen displayed at step S801 and "NEXT" is clicked, the screen becomes one for specifying measurement data (step S803). Using this screen, the user clicks a "REFER" button, thereby effecting a shift a screen for reading in the measurement data (step S806). It is possible for the user to examine the measurement data in detail using this screen. Further, the measurement data in this case is a data file that was saved at step S809. Application of calibration is performed at step S808. Processing from this point onward is similar to the processing described above.

If "DELETE DOWNLOADED DATA" is selected on the main screen displayed at step S801 and "NEXT" is clicked, the calibration data that was stored in the calibration-data storage section 21 of printer 2 is deleted (step S804). This processing is executed is response to a command sent from the server apparatus 1 to the printer 2. The exit screen is then displayed (step S810). Processing from this point onward is similar to that of the processing described above.

It is necessary to specify a printer of interest on the assumption that a plurality of printers have been connected to the network. A specific method of accomplishing this is to specify the printer on the user interface when patch data is output at step S802 in FIG. 8. For example, it is so arranged that the user selects a target printer by selecting the name of the printer to undergo calibration from the pull-down menu 142 in the dialog box 141 using the user interface screen shown in FIG. 14. It is so arranged that the application of the server apparatus 1 instructs the designated printer to perform patch output and downloads calibration data to the designated printer.

Thus, as described above, the present invention provides a printer correcting apparatus connected to the printer 2, which is capable of printing in color. The apparatus comprises input means (e.g., the scanner 3) for inputting color printing information (e.g., the printer chart 61) classified by density relating to each color component, which is used in color printing, output by the printer 2; first correcting means (e.g., the server apparatus 1) for executing calibration of the input means; and second correcting means for executing calibration of the printer 2 utilizing the color printing information that has been input using the corrected input means (scanner 3).

The printer correcting apparatus according to the present invention is characterized in that calibration of the input means (e.g., scanner 3) by the first correcting means (e.g., the server apparatus 1) is executed by updating a luminance-to-density conversion table, which is specific to the input means, upon comparing the table with reference input means.

The printer correcting apparatus according to the present invention is characterized in that the first correcting means (e.g., the server apparatus 1) includes first storage means (e.g., the storage section 113 for storing reference scanner characteristics data) for storing a reference input-level luminance-to-density conversion table that indicates the relationship between input level and luminance; first generating means for generating a target input-level luminance-to-density conversion table, which indicates the relationship between the input level and luminance of the input means, based upon a correction chart (e.g., the scanner chart 151) specific to the input means (e.g., the scanner 3); second generating means for generating a luminance correspondence table specific to the input means by combining an inverse function of the generated target input-level luminance-to-density conversion table and the reference input-level luminance-to-density conversion table; second storage means (e.g., storage sections 113, 114 for storing reference scanner luminance-to-density conversion tables) for storing reference scanner luminance-to-density conversion tables that indicate the relationship between at least one of luminance and density; and third generating means for generating a luminance-to-density conversion table that is specific to the input means by combining the luminance correspondence table specific to the input means and the reference luminance-to-density conversion table.

Further, the present invention provides a printer correcting apparatus connectable to a plurality of printers each of which is capable of printing in color, the apparatus further comprising selection means for selecting a printer that is to undergo calibration. This printer correcting apparatus of the invention is such that the second storage means stores a plurality of reference luminance-to-density conversion tables, and the third generating means generates the luminance-to-density conversion table specific to the input means using a reference luminance-to-density conversion table that corresponds to the printer selected. Furthermore, this printer correcting apparatus of the invention is connectable to the printer 2 via a network.

By means of the procedure set forth above, the printer 2 can readily be calibrated from the server apparatus 1 and, hence, the printer 2 is capable of performing stable color printing at all times. It is also possible to use a plurality of scanners as target scanners.

Furthermore, since the printer is capable of delivering stable printing, it is unnecessary to purchase costly equipment such as a densitometer and a highly accurate correction environment can be provided using existing equipment. Further, the printer correcting system according to the present invention is so adapted that an optimum luminance-to-density conversion table is created automatically in accordance with a difference in printer engine characteristics as caused by a difference in toners, etc.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium (or storage medium) on which the program codes of the software for performing the functions of the foregoing embodiment to a system or an apparatus have been recorded, reading the program codes with a computer (e.g., a CPU or MPU) of the system or apparatus from the recording medium, and then executing the program codes. In this case, the program codes read from the recording medium implement the novel functions of the embodiment, and the recording medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process based upon the designation of program codes and implements the functions according to the embodiment.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire process based upon the designation of program codes and implements the function of the above embodiment.

In a case where the present invention is applied to the above-mentioned recording medium, program code corresponding to the flowcharts described earlier is stored on the recording medium.

Thus, in accordance with the present invention, as described above, calibration for the purpose of providing a printer with stabilized printing characteristics can be performed more easily. Further, it is possible to create calibration data in conformity with a plurality of printers in which there are differences among toners and differences among printer engine characteristics.

The present invention is not limited to the above embodiments and various changes and modifications can be made within the spirit and scope of the present invention. Therefore, to apprise the public of the scope of the present invention, the following claims are made.

What is claimed is:

1. A printer correcting apparatus connected to a printer capable of color printing, comprising:
   input means for inputting color printing information classified by density relating to each color component, which is used in color printing, output by the printer;
   first correcting means for executing calibration of said input means; and
   second correcting means for executing calibration of the printer utilizing the color printing information that has been input using said input means, which has been corrected,
   wherein said first correcting means includes:
      first storage means for storing a reference input-level luminance-to-density conversion table that indicates the relationship between input level and luminance;
      first generating means for generating a target input-level luminance-to-density conversion table, which indicates the relationship between the input level and luminance of the input means, based upon a correction chart specific to said input means;

second generating means for generating a luminance correspondence table specific to said input means by combining an inverse function of the generated target input-level luminance-to-density conversion table and the reference input-level luminance-to-density conversion table;

second storage means for storing at least one of reference scanner luminance-to-density conversion tables that indicate the relationship between luminance and density; and third generating means for generating a luminance-to-density conversion table specific to said input means by combining the luminance correspondence table specific to said input means and the reference luminance-to-density conversion table.

2. The apparatus according to claim 1, wherein calibration of said input means by said first correcting means is executed by updating a luminance-to-density conversion table, which is specific to said input means, upon comparing the table with reference input means.

3. The apparatus according to claim 1, wherein the printer correcting apparatus is connectable to a plurality of printers each of which is capable of printing in color, said apparatus further comprising selection means for selecting a printer that is to undergo calibration.

4. The apparatus according to claim 1,
wherein said second storage means stores a plurality of reference luminance-to-density conversion tables; and
wherein said third generating means generates the luminance-to-density conversion table specific to said input means using a reference luminance-to-density conversion table that corresponds to the printer selected.

5. The apparatus according to claim 1, wherein said printer correcting apparatus is connectable to the printer via a network.

6. A method of controlling a printer correcting apparatus connected to a printer capable of color printing and having input means for inputting color printing information classified by density relating to each color component, which is used in color printing, output by the printer, said method comprising:

a first correcting step of executing calibration of said input means; and a second correcting step of executing calibration of the printer utilizing the color printing information that has been input using said input means, which has been corrected, wherein said printer correction apparatus further includes first storage means for storing a reference input-level luminance-to-density conversion table that indicates the relationship between input level and luminance, and second storage means for storing reference scanner luminance-to-density conversion tables that indicate the relationship between at least one of luminance and density, said first correcting step including:

a first generating step of generating a target input-level luminance-to-density conversion table, which indicates the relationship between the input level and luminance of the input means, based upon a correction chart specific to said input means;

a second generating step of generating a luminance correspondence table specific to said input means by combining an inverse function of the generated target input-level luminance-to-density conversion table and the reference input-level luminance-to-density conversion table; and a third generating step of generating a luminance-to-density conversion table specific to said input means by combining the luminance correspondence table specific to said input means and the reference luminance-to-density conversion table.

7. A computer-readable storage medium storing a computer program for controlling a printer correcting apparatus connected to a printer capable of color printing and having input means for inputting color printing information classified by density relating to each color component, which is used in color printing, output by the printer, said computer program functioning as:

first correcting means for executing calibration of said input means; and second correcting means for executing calibration of the printer utilizing the color printing information that has been input using said input means, which has been corrected, wherein said first correcting means includes:

first storage means for storing a reference input-level luminance-to-density conversion table that indicates the relationship between input level and luminance;

first generating means for generating a target input-level luminance-to-density conversion table, which indicates the relationship between the input level and luminance of the input means, based upon a correction chart specific to said input means;

second generating means for generating a luminance correspondence table specific to said input means by combining an inverse function of the generated target input-level luminance-to-density conversion table and the reference input-level luminance-to-density conversion table;

second storage means for storing at least one of reference scanner luminance-to-density conversion tables that indicate the relationship between luminance and density; and third generating means for generating a luminance-to-density conversion table specific to said input means by combining the luminance correspondence table specific to said input means and the reference luminance-to-density conversion table.

8. A printer correcting method comprising the steps of:

selecting a desired printer from a plurality of printers connected to a network;

generating a luminance-to-density conversion characteristic for a target scanner based upon a luminance-to-density conversion characteristic of a reference scanner decided in accordance with the selection and an inter-scanner luminance characteristic decided from characteristic data of the target scanner, which is obtained by reading a scanner correction chart, and characteristic data of the reference scanner;

reading patch data, which has been read by the target scanner and printed by the desired printer, by the target scanner and processing the patch data using the luminance-to-density conversion characteristic for the target scanner; and creating calibration data for the selected printer.

9. The method according to claim 8, wherein the calibration data is downloaded to the selected printer via the network.

10. The method according to claim 8, wherein the plurality of printers have different engine characteristics, and a plurality luminance-to-density conversion characteristics for reference scanners exist in accordance with these engine characteristics.

11. The method according to claim 8, wherein the characteristic data of the reference scanner is data obtained by reading the scanner correction chart by the reference scanner.

12. A printer correcting apparatus comprising:
means for selecting a desired printer from a plurality of printers connected to a network;
means for generating a luminance-to-density conversion characteristic for a target scanner based upon a luminance-to-density conversion characteristic of a reference scanner decided in accordance with the selection and an inter-scanner luminance characteristic decided from characteristic data of the target scanner, which is obtained by reading a scanner correction chart, and characteristic data of the reference scanner;
means for reading patch data, which has been read by the target scanner and printed by the desired printer, by the target scanner and processing the patch data using the luminance-to-density conversion characteristic for the target scanner; and
means for creating calibration data for the selected printer.

13. A printer correcting apparatus connected to a printer capable of color printing, comprising:
input means for inputting color printing information classified by density relating to each color component, which is used in color printing, output by the printer;
first correcting means for executing calibration of said input means; and
second correcting means for executing calibration of the printer utilizing the color printing information that has been input using said input means, which has been corrected, wherein said first correcting means includes:
first storage means for storing a reference input-level luminance-to-density conversion table that indicates the relationship between input level and luminance;
first generating means for generating a target input-level luminance-to-density conversion table, which indicates the relationship between the input level and luminance of the input means, based upon a correction chart specific to said input means;
second generating means for generating a luminance correspondence table specific to said input means by combining an inverse function of the generated target input-level luminance-to-density conversion table and the reference input-level luminance-to-density conversion table;
second storage means for storing plural reference scanner luminance-to-density conversion tables that indicate the relationship between luminance and density; and
third generating means for generating a luminance-to-density conversion table specific to said input means by combining the luminance correspondence table specific to said input means and the reference luminance-to-density conversion table.

14. The apparatus according to claim 12, wherein the calibration data is downloaded to the selected printer via the network.

15. The apparatus according to claim 12, wherein the plurality of printers have different engine characteristics, and a plurality luminance-to-density conversion characteristics for reference scanners exist in accordance with these engine characteristics.

16. The apparatus according to claim 12, wherein the characteristic data of the reference scanner is data obtained by reading the scanner correction chart by the reference scanner.

* * * * *

UNITED STATES PATENT AND TRADEMARK OFFICE
CERTIFICATE OF CORRECTION

| | |
|---|---|
| PATENT NO. | : 7,259,892 B2 |
| APPLICATION NO. | : 10/372074 |
| DATED | : August 21, 2007 |
| INVENTOR(S) | : Nakajima |

It is certified that error appears in the above-identified patent and that said Letters Patent is hereby corrected as shown below:

On The Title Page:
ABSTRACT Item (57), Insert:
-- Disclosed are a printer correcting apparatus and method of controlling the same for making it possible to more easily perform calibration for the purpose of providing a printer with stabilized printing characteristics. A server apparatus (1) is connected via a network (5) to a color printer (2) to be corrected. A scanner (3) connected to the server apparatus (1) is used to input a printer chart (61), which serves as color printing information classified by density relating to each color component, which is used in color printing, output by the printer (2). The server apparatus (1) executes calibration of the operation-start command signal (3) and calibrates the printer (2) utilizing the printer chart (61) that has been input using the corrected scanner (3). --.

COLUMN 7:
Line 29, "as by" should read -- by --.

COLUMN 9:
Line 19, "fined tuned" should read -- fine tuned --.

COLUMN 10:
Line 47, "is response" should read -- in response --.

COLUMN 15:
Line 1, "plurality" should read -- plurality of --;
Line 28, "density" should read -- a density --; and
Line 35, "corrected, wherein" should read -- corrected, ¶ (new paragraph) wherein --.

UNITED STATES PATENT AND TRADEMARK OFFICE
CERTIFICATE OF CORRECTION

PATENT NO. : 7,259,892 B2
APPLICATION NO. : 10/372074
DATED : August 21, 2007
INVENTOR(S) : Nakajima It is certified that error appears in the above-identified patent and that said Letters Patent is hereby corrected as shown below:

<u>COLUMN 16</u>:
Line 28, "plurality" should read -- plurality of --.

Signed and Sealed this

Twenty-ninth Day of April, 2008

JON W. DUDAS
*Director of the United States Patent and Trademark Office*